United States Patent [19]
Birchak et al.

[11] Patent Number: 5,763,773
[45] Date of Patent: Jun. 9, 1998

[54] ROTATING MULTI-PARAMETER BOND TOOL

[75] Inventors: James Robert Birchak, Spring; James Wayne Stroud, Houston; Batakrishna Mandal, Missouri City; John Wesley Minear, Houston, all of Tex.

[73] Assignee: Halliburton Energy Services, Inc., Houston, Tex.

[21] Appl. No.: 706,143

[22] Filed: Sep. 20, 1996

[51] Int. Cl.$^6$ ............................. G01V 1/52; G01V 1/46
[52] U.S. Cl. ............... 73/152.58; 73/602; 367/35; 181/104; 181/105; 364/422
[58] Field of Search .................... 73/152.54, 152.58, 73/602; 367/25, 28, 35; 181/104, 105; 250/265, 266; 364/422

[56] References Cited

U.S. PATENT DOCUMENTS

| | | | |
|---|---|---|---|
| 3,691,518 | 9/1972 | Schuster | 367/28 |
| 4,255,798 | 3/1981 | Havira | 367/35 |
| 4,289,023 | 9/1981 | Rader | 73/151 |
| 4,495,606 | 1/1985 | Smith | 367/86 |
| 4,703,427 | 10/1987 | Catala et al. | 364/422 |
| 4,757,479 | 7/1988 | Masson et al. | 367/35 |
| 4,805,156 | 2/1989 | Atali et al. | 367/35 |
| 5,089,989 | 2/1992 | Schmidt et al. | 367/35 |
| 5,377,160 | 12/1994 | Tello et al. | 367/35 |

*Primary Examiner*—Hezron E. Williams
*Assistant Examiner*—Rose M. Miller
*Attorney, Agent, or Firm*—Conley,Rose & Tayon, P.C.

[57] ABSTRACT

A multi-part logging tool that allows measurement of several distinct independent parameters, which are in turn used to solve for secondary parameters that give information about the properties of the cement outside the casing. Secondary parameters affecting the measured signals are: casing thickness, bond of cement to casing, cement acoustic impedance, cement thickness, channel size and channel material. The present invention comprises a rotating tool that supports a plurality of specifically configured transducers that interrogate a region behind casing having a 10 degree azimuthal resolution and a depth of investigation of at least 0.75 inches behind casing. The transducers on the rotating tool include an array of angled beam transducers, a single-housing pitch-catch transducer and a radial, pulse echo transducer.

43 Claims, 10 Drawing Sheets

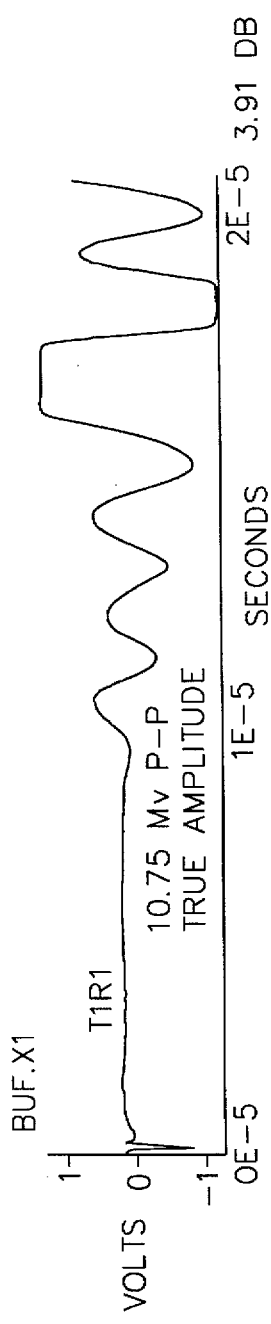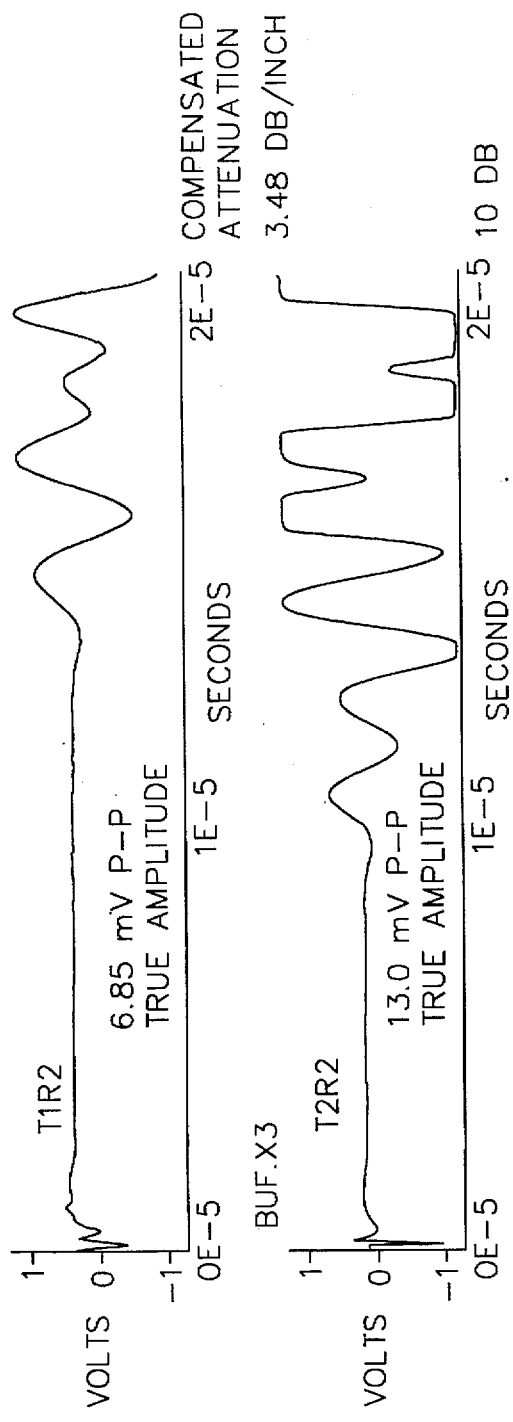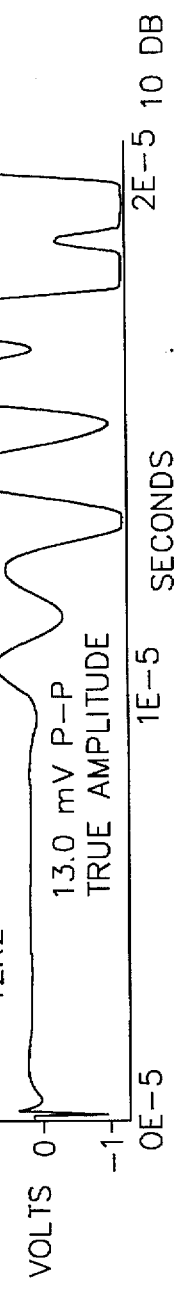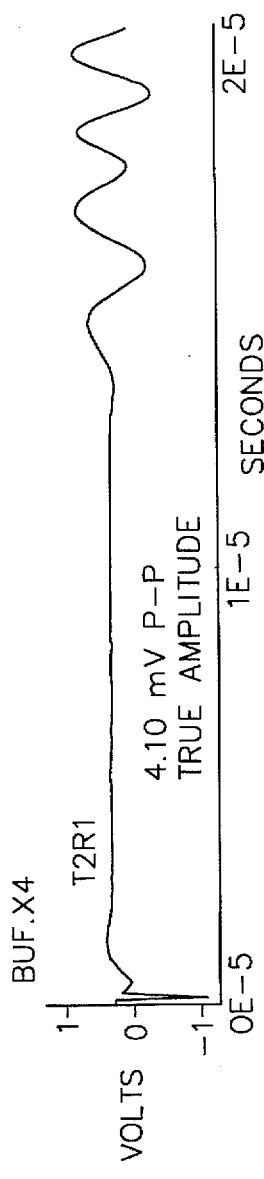
FIG. 5A
FIG. 5B
FIG. 5C
FIG. 5D

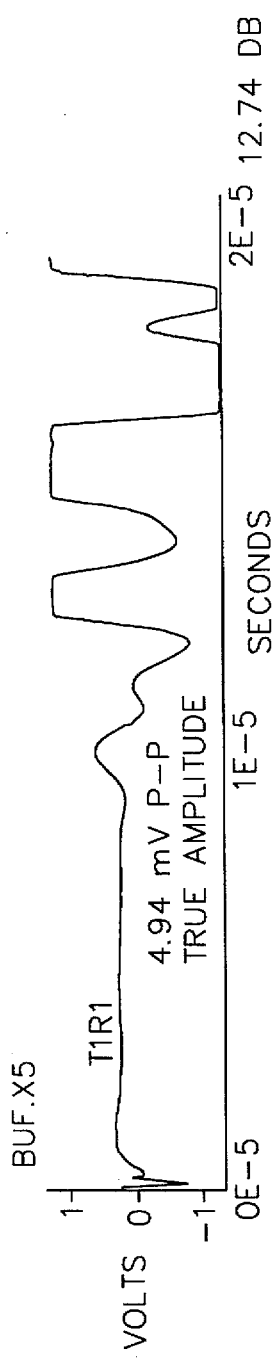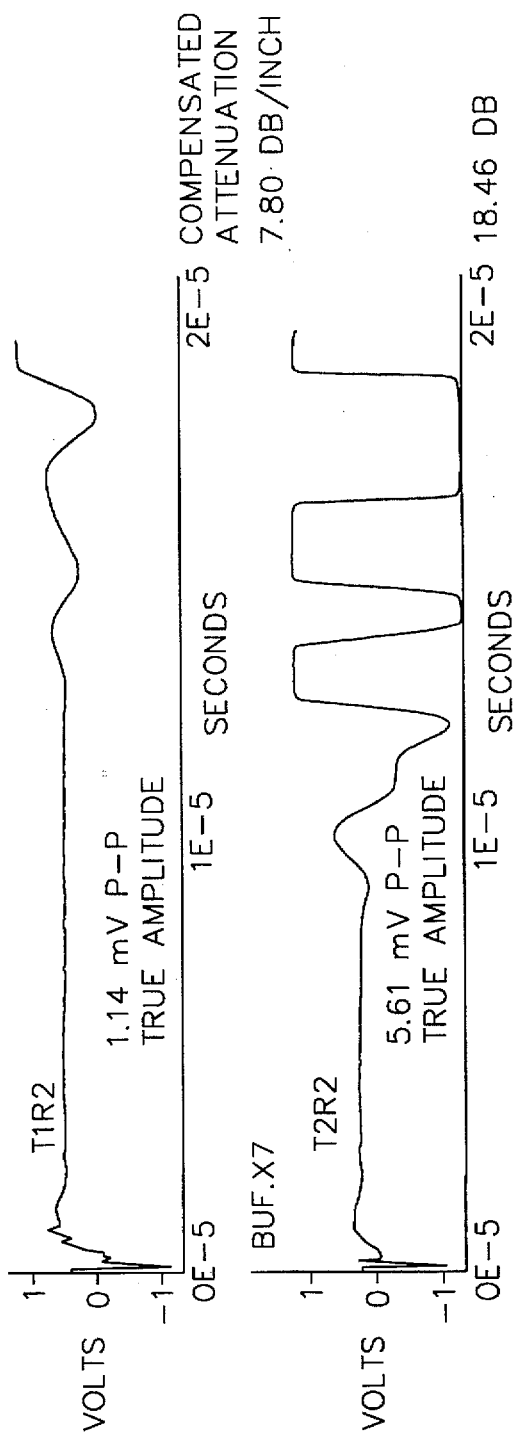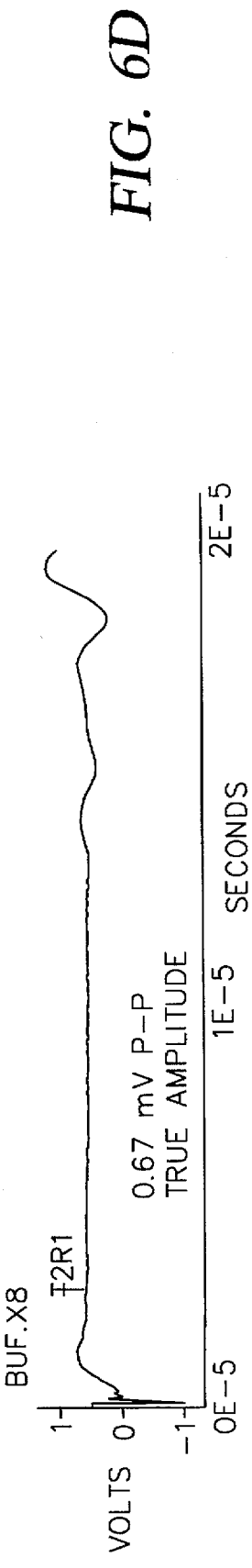

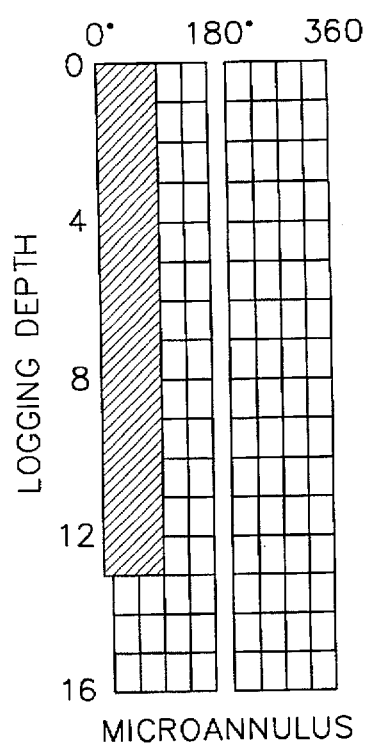
FIG. 11A MICROANNULUS
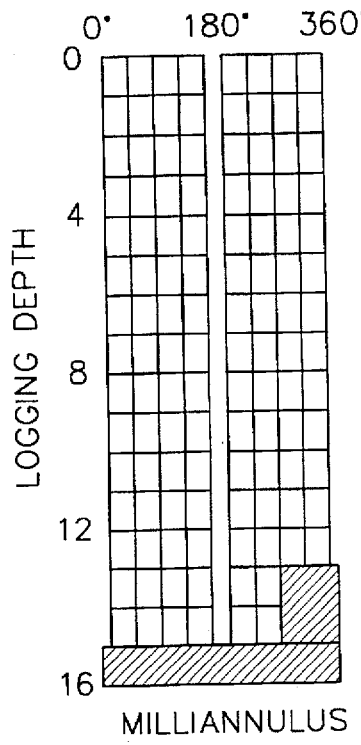
FIG. 11B MILLIANNULUS
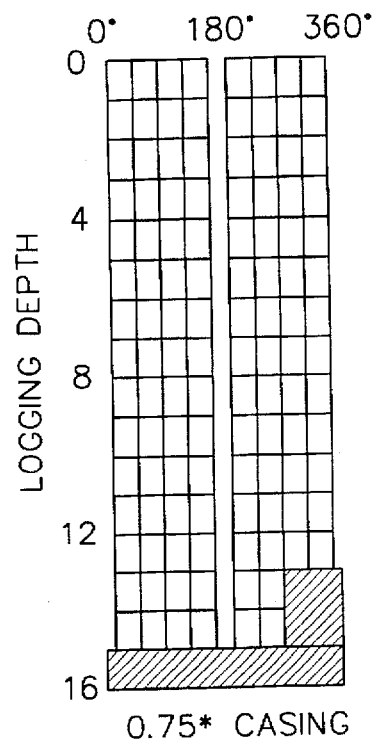
FIG. 11C 0.75* CASING
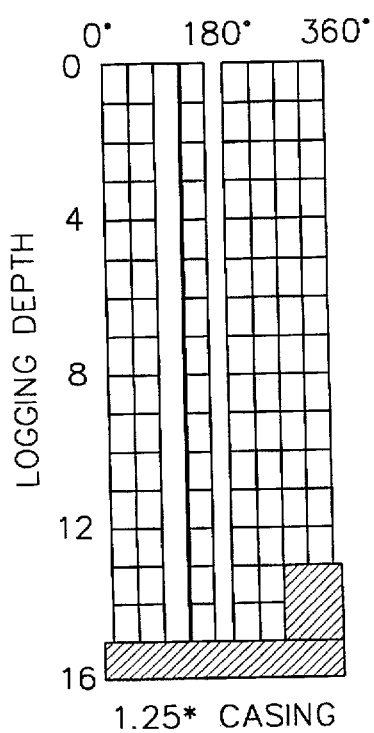
FIG. 11D 1.25* CASING
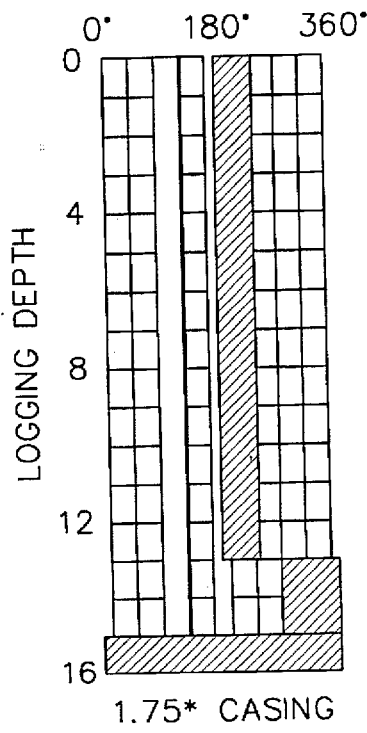
FIG. 11E 1.75* CASING
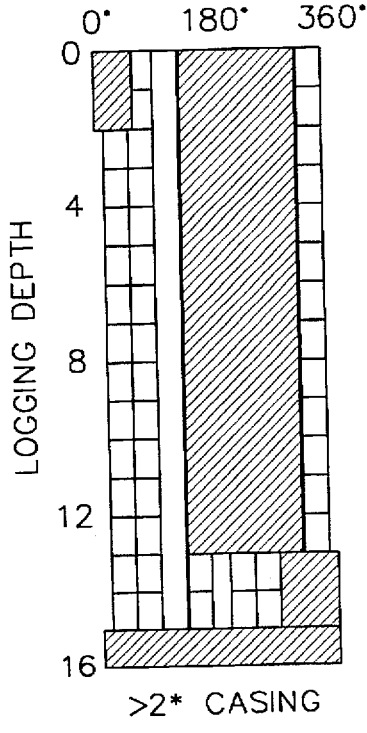
FIG. 11F >2* CASING

ROTATING MULTI-PARAMETER BOND TOOL

TECHNICAL FIELD OF THE INVENTION

The present invention relates generally to an apparatus and method useful for determining the presence of cement outside a borehole casing, for determining the quality of the bond between the cement and the outside of the casing and for determining the distance to the first acoustic reflector behind the casing. More particularly, the present invention relates to a logging tool that comprises an array of specifically configured transducers adapted to minimize false readings and provide an accurate quantitative record of the cement bond and of the distance to one or more reflectors behind casing.

BACKGROUND OF THE INVENTION

In the oil and gas industry, wells are completed by setting a string of casing (pipe) in the borehole and filling the annulus between casing and borehole with cement. The cement separates the various formation zones and particularly separates the productive oil and gas bearing formations from non-productive formations such as water-bearing formations. After the zones have been separated by the cementing operation, only the productive formations are perforated for production. Once the casing is perforated, any defects in the cement or cement-to-casing bond can result in incomplete separation of the formation zones and contamination between them as a result of migration of fluids under pressure through voids or cracks. This is particularly undesirable where fluids from water-bearing strata migrate into fluids in a production zone, resulting in decreased production of the desired hydrocarbons.

Hence, it is desirable to provide a tool that is capable of detecting and determining the quality of the cement-to-casing bond. It is further desirable to be able to detect channels or fissures in the cement, which may allow migration of fluids even if the cement is adequately bonded to the casing. A variety of tools and methods have been devised to accomplish these purposes, but to date none has been completely effective.

Prior art bonds tools are susceptible to at least four causes of inaccurate readings. First, prior art bonds tools cannot differentiate between a large gap and a small gap between casing and cement. A small gap (0.001 inches) created as a result of an over-pressure during cementing on the order of 5,000 psi is typically large enough to allow leakage of well fluids through the cement. This gap may be too small to repair with conventional remedial cementing. In contrast, a gap on the order of 0.125 inches can be repaired with conventional remedial cementing. Conventional bond tools cannot measure either gap thickness.

Second, prior art bond tools cannot always differentiate between a bad cement-to-casing bond and thin cement that is adequately bonded to the casing. If the annulus between the borehole wall and the casing is less than 1 inch thick, the cement layer bonded to the casing in this region may be falsely detected as a bad cement bond by prior art tools.

A third weakness inherent in prior art tools is their inability to distinguish between a bad bond and low acoustic impedance cement. The properties of cement, including its acoustic impedance, vary widely from batch to batch, with the result that certain low impedance cements create the same type of sonic response as a fluid and are therefore falsely detected as a bad bond.

Lastly, prior art tools are unable to consistently distinguish between fissures or channels in the cement that are filled with packed mud cake, and therefore are unlikely to allow fluid migration, and channels that are filled with liquid or gas and could later provide gas migration pathways.

Certain types of nondestructive testing for metal tubular goods involve the use of signals in the 2 MHz range for detection of cracks in the metal, but such techniques have not heretofore been used in bond tools because the impedance mismatch at the steel-to-cement boundary creates reverberations in the casing which tend to mask the signal from the cement.

Hence, it is desired to provide a bond imaging tool that can detect and distinguish between bad bonds and other, innocuous cement bonding conditions.

SUMMARY OF THE INVENTION

The present invention provides a multi-part tool that allows measurement of several distinct independent parameters, which are in turn used to solve for secondary parameters that give information about the properties of the cement outside the casing. Secondary parameters affecting the measured signals are: casing thickness, bond of cement to casing, cement acoustic impedance, channel size and channel material. By measuring as many independent parameters as there are secondary parameters, one can solve for the values of the secondary parameters. Conventional tools distinguish between microannuli (gaps less than 0.0002 inches) and milliannuli (larger gaps) by measuring parameters both with and without an overpressure that is sufficient to close the microannuli but not sufficient to close the milliannuli, thereby allowing detection of the latter. The tool of the present invention combines a similar use of over-pressure and conventional bond pulse-echo measurements with a technique entailing use of a radial ultrasonic transmission having a frequency of 2 MHz, and a novel transducer configuration. In combination, these aspects of the present tool allow gap thickness measurement of milliannuli having gaps between 0.0002 and 0.05 inches wide. The present invention further includes a 2 MHz transducer configured so that the transmitter and receiver are less than 0.04 inches apart. This closely spaced pair of transducers is referred to as a single housing "pitch-catch" configuration and produces better measurement of milliannulus gap than previously methods. The improvement in the milliannulus detection is enhanced by the use of a highly damped 2 MHz frequency. Conventional 0.5 MHz pulse-echo transducers have ringdown persisting between successive casing back wall echoes. The 2 MHz transducer pair gives small casing reflections and quiet time windows between successive back wall echoes, which allows milliannulus echoes to be detected in these quiet time windows.

In addition, the present invention uses measurement of the attenuation of guided (symmetric plate) waves transmitted axially along the casing, to detect a lack of cement casing bond more accurately than conventional pulse-echo radial thickness mode compressional waves.

The present invention uses guided wave readings made during selected time windows to distinguish between various types of measurement data available in the received signal, including readings relating to cement quality from waves guided at various radial depths in steel, cement and water, to allow separation and measurement of one or more desired signals.

Another aspect of the present invention allows the detection and measurement of channels in the cement annulus. While use of a high frequency signal (2 MHz) allows distinction between small and very small gaps in the cement, it is not as useful in measuring gaps larger than one-half inch. Instead, the present invention uses a pitch-catch transducer configuration, which allows measurement of fluid thickness greater than ⅜ inch and solid thickness greater than 0.5 inch outside the casing.

The present invention further includes an optimized spacing between the transducers and the casing so as to minimize mud attenuation of the signal. This spacing is measured and confirmed ultrasonically to compensate for tool decentralization. Statistical processing techniques are used in accordance with the present invention to compensate for the effect of decentralization as a function of azimuthal direction of the tool, resulting in a constant interpreted signal. A volume cell (voxel) configuration is also developed to provide a frame of reference for the measured data. This allows the present system to identify the distances to the first reflectors behind cement and pinpoint detected flaws.

All of the above measurements are combined and analyzed so as to allow simultaneous interpretation of the following factors: casing thickness, gap thickness, bond, cement thickness, cement impedance, and channel size, shape and location.

BRIEF DESCRIPTION OF THE DRAWINGS

FIG. 5 comprises four oscilloscope traces showing near and far receiver waveforms for each transmitter for free aluminum plate;

FIG. 6 comprises four oscilloscope traces showing near and far receiver waveforms for each transmitter for bonded aluminum plate;

FIG. 11 is a series of grids simulating the results of the multi-parameter analysis of the present invention, showing quantitative analysis of the cement along a length of casing, at incrementally increasing radial distances from the casing and in 45° azimuthal increments around the circumference of the casing.

DETAILED DESCRIPTION OF THE INVENTION

The present invention comprises a tool adapted to evaluate the sufficiency of the cement plug and its bond to the casing. The invention further comprises a method for using the tool so as to optimize the accuracy of its measurements. Both the tool and method for using it are described in terms of a preferred embodiment as set forth below.

Tool

Figure 1:
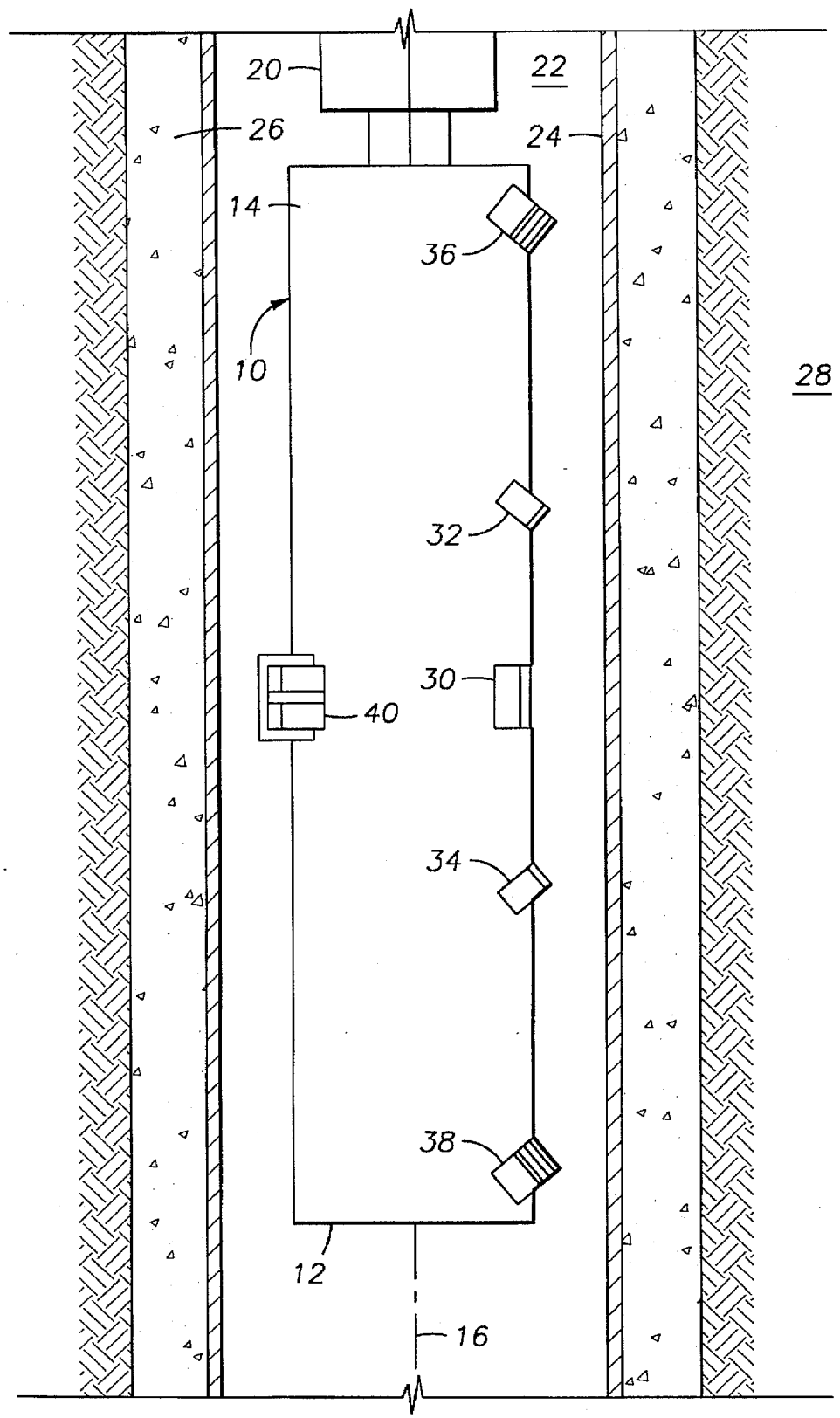
FIG. 1 is a schematic representation of the logging tool of the present invention positioned in a borehole.

Referring now to FIG. 1, the present invention comprises a logging tool 10 having first and second ends 12, 14 and an axis 16. Tool 10 is connected to an uphole system 20 at its second end 14. The components of uphole system 20 are generally known in the art and may include a motor, scanner, downhole communications equipment and the like (not shown). When tool 10 is in a borehole as shown in FIG. 1, it is surrounded by mud 22, casing 24, cement 26 and formation 28. An array of transducers is mounted on tool 10 as discussed below and is adapted to provide sufficient independent measurements to allow solution of the numerical results for the dependent factors identifying the presence, quality and bonding of cement outside the casing wall. It will be understood that each transducer is electrically connected to circuitry (not shown) that controls the transducers and receives and processes information therefrom, as is known in the art. The transducers in the array include one standard pulse-echo transducer 30, a first pair of spaced-apart transducers 32, 34, a second pair of spaced-apart transducers 36, 38 and a high frequency single housing pitch-catch transducer 40.

Transducer 30 is preferably located midway between the ends 12, 14 of logging tool 10 and oriented so that its outer surface is parallel to the axis of the tool. Transducer 30 is positioned in tool 10 so that its outer surface is between about 1 and 2 inches, and preferably approximately 1.25 inches, from the inside of the casing wall when tool 10 is centered in the casing. According to a preferred embodiment, transducer 30 comprises a pulse-echo transducer (PET) or circumferential acoustic scanning tool transducer, such as are known in the art. A pulse-echo technique uses a single transducer functioning first as a transmitter and then as a receiver measuring signals that are reflected back to it. By way of example only, for steel casing having a thickness of 0.3 inches, the preferred frequency for transducer 30 is approximately 380 kHz. The transducer bandwidth in such a case may be approximately 300 kHz. If the casing thickness is known, an optimal frequency $f$ at which transducer 30 operates efficiently can be calculated according to the equation;

$$f = v_c / 2d \qquad (1)$$

where $V_C$ is the compressional speed of sound in the casing and d is the casing wall thickness. Those skilled in that art will recognize that the optimal values of several parameters, including spacing from the casing, frequency and dimensions of 30 transducer, and all of the transducers described below will depend, among other things, on the casing thickness, type of formation, mud weight, all of which are known.

Transducer 30 generates a wave with atomic motion perpendicular to the surface of the casing (radial propagation). This atomic motion creates compressional waves in the material behind the casing. The acoustic impedance of the material behind the casing affects the way these waves are reflected. Thus, the reflectivity of the back wall of the casing with respect to the signal from transducer 30 gives a measurement of the acoustic impedance of the material behind casing.

According to a preferred embodiment of the present invention, transducers 32, 34 lie in a line with transducer 30 and are spaced apart from it along that line, with the line preferably being substantially parallel to the tool axis. Each transducer 32, 34 is oriented so that the plane of its outer surface is inclined toward central transducer 30 approximately 0 to 27 degrees and preferably approximately 12 degrees with respect to the tool axis 30. Transducers 32, 34 are preferably located (center to center distance) between approximately one and five inches, and more preferably 1.5 inches on either side of transducer 30. Transducers 32, 34 are positioned in tool 10 so as to be approximately 0.75 inches from the inside of the casing wall when tool 10 is centered in the casing. According to a preferred embodiment, transducers 32, 34 each comprise a dual-purpose transceiver capable of transmitting at approximately 500 kHz and receiving at frequencies from 80 kHz to 500 kHz. In the pitch-catch mode, one transducer 32 transmits a wave that refracts to a shear wave entering steel 24 and subsequently refracts to a compressional wave entering cement or fluid 26 behind casing 24. The refracted wave reflects from the reflective boundary between materials 26 and 28 and returns to be received by the other transducer 34. Alternatively, or in addition, a signal can also be sent from transducer 34 to transducer 32. This pitch-catch mode is used to size channels and thin cement.

According to a preferred embodiment, transducers 32, 34 are rectangular prisms oriented so that the dimensions of their outer faces have a longitudinal dimension and a cross dimension. The cross dimension depends on casing curvature and therefore is proportional to minimum casing ID. By way of example, for a minimum casing ID of 4.4 inches transducers 32, 34 are 0.4 inches across. The longitudinal dimension depends on the desired radiation pattern beam spread. For frequencies from 180 kHz to 500 kHz, the desired collimation is achieved with longitudinal dimensions of 0.25 to 1.5 inches and preferably approximately 0.3 inches. It will be understood that larger transducers can be used in larger ID casings and smaller transducers can be used in smaller ID casings.

Transducers 36, 38 preferably lie in the same line with transducers 30, 32 and 34. Each transducer 36, 38 is oriented so that the plane of its outer surface is inclined approximately 0 to 27 degrees, and preferably approximately 25 degrees with respect to the tool axis. Transducer 36 is preferably located (center to center distance) between approximately one and five inches, and more preferably three inches, from transducer 32 and transducer 38 is preferably located between approximately one and five inches, and more preferably three inches, from transducer 34. Transducers 36, 38 are positioned in tool 10 so as to be between 0.5 and 1 inch, and preferably approximately 0.75 inches, from the inside of the casing wall when tool 10 is centered in the casing. According to a preferred embodiment, transducers 36, 38 are capable of transmitting at frequencies from about 80 kHz to about 500 kHz, and most preferably approximately 180 kHz.

In a preferred embodiment, transducers 36, 38 are rectangular prisms that are oriented so that the dimensions of their outer faces are 0.8 inches in the longitudinal direction by 0.4 inches across. Transducers 36, 38 preferably comprise stacked piezoelectric elements. The stacking is designed to produce a field strength of 8 volts per 0.001 inch or less in the piezoelectric element. A large field strength is desired for strong signals. For example, a stack made of four elements, with each element resonant at 500 kHz, would have a height of approximately 160 mils per element, giving a stack height of 640 mils and a resonant frequency of 125 kHz. Each element should have a voltage less than 1280 volts. Stacking has the advantage that an excitation signal with a fast rising edge, such as one faster than 0.5 μsec, can excite the resonances of either individual elements, pairs of elements, or the entire stack, providing 500 kHz, 250 kHz and 125 kHz signals, respectively. The correspondingly fast falling edge should be timed to occur at half the period of the lowest resonance frequency for the entire stack. These excitation conditions give a broad frequency bandwidth needed to measure both bond and layer thickness.

Like transducer 30, transducer 40 is preferably located midway between the ends 12, 14 of logging tool 10 and oriented so that its outer surface is parallel to the axis of the tool. Transducer 40, however, need not lie in the same radial plane as the other transducers. It will be understood that the farther out of this radial plane transducer 40 lies, the more its zone of interrogation will be separated from the zone of interrogation of the other transducers. Depending on the pitch at which tool 10 is operated, this difference may or may not be significant. Transducer 40 is preferably positioned in tool 10 so as to be only approximately 0.75 inches from the inside of the casing wall when tool 10 is centered in the casing. According to a preferred embodiment, transducer 40 comprises a single-housing pitch-catch transducer combination, as described in detail below. By way of example only, for a casing having a thickness in the range of 0.15 inches to 0.6 inches, the preferred frequency range for transducer 40 is approximately 2 MHz.

Figures 2, 4:
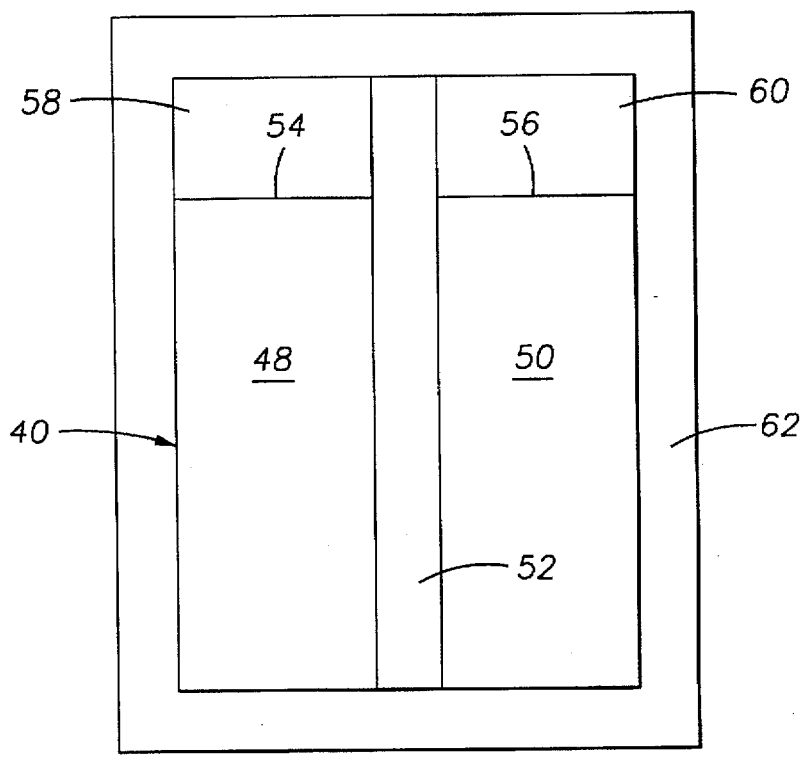
FIG. 2 is a schematic representation of a single housing pitch-catch transducer in accordance with the present invention.
FIG. 4 is a sketch of a transducer configuration used to show discrimination between free and bonded aluminum plates.

The designation "pitch-catch" is used herein to describe a transmitter/receiver combination wherein the transmitter and receiver comprises separate transducers. For transducer 40, the pitch-catch piezoelectric element pair has been reduced in size as to render it capable of fitting within a single cylindrical transducer package. This has the result that both the transmitter and receiver are located within an area less than the surface area of a typical transducer. Referring to FIG. 2, one technique for achieving this proximity is to form an acoustic isolating layer 52 between the two halves of the cylindrical transducer package 40. Isolating layer 52 preferably has a thickness less than 0.125 inches. A two-part attenuative backing having acoustic impedance matched to the piezoelectric forms a pair of transducer mounts 48, 50 having two supporting surfaces 54, 56 respectively. Small piezoelectric transducer elements 58, 60 are mounted on surfaces 54, 56 respectively, and the whole transducer package 40 is embedded in an insulating and protective material 62, such as epoxy. Positioning the receiver so close to the transmitter reduces the angle at which a signal must be transmitted to reach the receiver and therefore allows analysis of individual multiple echoes in the casing. Thin cement echoes can then be detected in the valleys between multiple echoes. This is in contrast to conventional techniques, which are not effective for measuring thin cement because their smaller thin cement signals tend to be masked by the larger casing echoes.

While most transducer housings are circular, it has been found that when this circular area is horizontally divided into two D-shaped transmitting and receiving areas, the curvature of the casing affects the output of the device because the corners of each D-shaped transducer are somewhat closer to the casing than is its center. Therefore, it is preferable to eliminate the side portions of each transducer, leaving only the essentially rectangular central portions. According to a preferred embodiment, the azimuthal dimension of the rectangular central portion measures less than 0.5 inch and the axial length of each piezoelectric is less than 0.55 inch. If the outer diameter of a standard 1.4 inch single transducer is used, such a pitch-catch transducer pair will fit into preexisting transducer fittings.

Logging Operation

Figure 3:
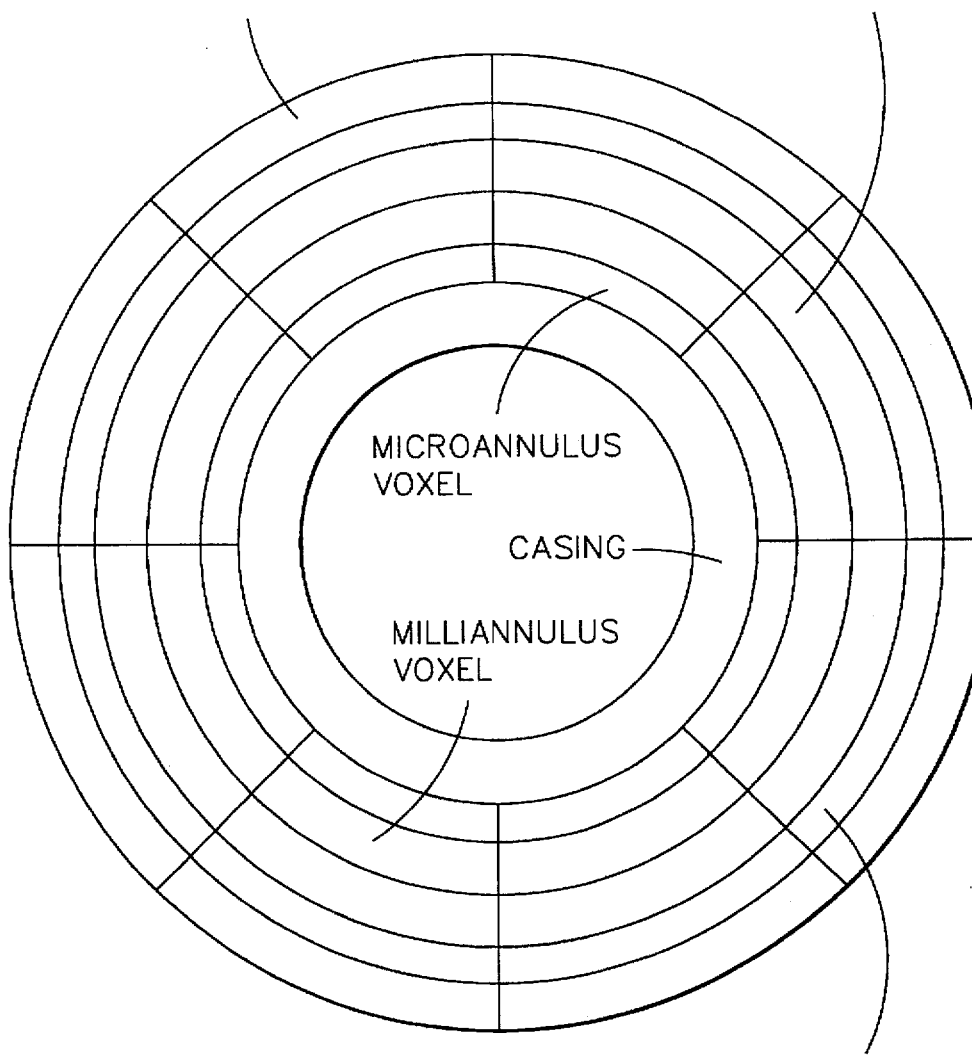
FIG. 3 is an example of a volume cell (voxel) configuration for imaging reflectors behind casing.

To facilitate understanding of the present invention, the region surrounding the casing is represented in cross-section in FIG. 3 as an annular volume comprised of a plurality of volume cells (hereinafter "voxels"). The cross-sectional area is divided into concentric rings representing different radial distances behind casing 24. In practice, the azimuthal extent of each voxel is approximately 4 to 20 degrees, but for purposes of the present illustration, the voxels are shown extending 45 degrees azimuthally. It will be understood that the annular volume in question extends parallel to the length of the tool, which lies normal to the plane of the Figure. Thus, the cross-section shown in FIG. 3 represents a particular depth in the well. The axial length of a voxel equals the axial extent of the tool's interrogation zone. For the attenuation method described above, the axial extent is the distance between receivers $R_1$ and $R_2$. For the conventional pulse-echo tool, the axial extent equals the axial length of the piezoelectric element. Breakdown of the volume in question into voxels in this manner allows interpretation of the acoustic reflections at various penetration distances behind casing.

To carry out a logging operation using the present tool, initial measurements with the pulse-echo transducer 30 and a pair of transducers in the pitch-catch mode are made in the absence of applied pressure. If some section of casing appears unbonded, measurements are made while the pressure in the annulus is at least approximately 500 psi to 1000 psi greater than operational pressures. This pressure expands the casing sufficiently to close microannuli, but not milliannuli. If the pressurized testing gives a bonded signal, measurements made using the 2 MHz signal of pitch-catch transducer 40 can be analyzed to determine whether thin cement is present in this region. If the application of pressure does not give a bonded signal, measurements from the 2 MHz transducer and one pair of pitch-catch transducers measuring attenuation can be used to estimate the thickness of the fluid behind casing as described below. Because the frequency of transducer 40 (2 MHz) is so great, the individual reflections of the back wall of the casing 24 decay before the arrival of the next reflection. The fluid speed of sound is approximately one-fourth that of casing. Thus, fluid gaps up to one-fourth of the wall thickness (0.15 inches to 0.6 inches) can be observed in the time window before the arrival of the next reflection from the second round trip within the casing. Fluid gaps as small as 0.05 inches have been detected using the present technique. It will be understood that in practice a pressurized log of a well is made, if at all, after the unpressurized log has been completed using all transducers.

The actual frequency of the casing resonance, which can be used to determine casing thickness in instances of suspected casing corrosion, can be obtained using pulse-echo techniques with transducer 30. Alternatively, if the conventional technique gives errors because of multiple mode arrivals in the relevant time window, a new algorithm can be used to calculate the casing resonance frequency from the received signal. The new algorithm uses a conversion of the raw data to an arc sin function that is preferably calculated to give an output value that increases with increasing time. These output values are fit by least squares to the increasing time to give a regression line. The slope of the regression line gives the signal frequency in the time window selected. In order to use the arc sin function, the raw data are normalized to have a maximum value of ±1 in the time window by dividing each raw data point by the maximum absolute value of the raw data in the time window.

A variance technique is used to eliminate the windows that include arrivals of extra modes. For example, some windows may appear to have the wrong frequencies because of the arrival of modes from reflectors behind casing. These windows are omitted by rejecting the windows having frequencies more than three standard deviations from the average window frequency.

Once the resonance frequency has been calculated in this manner, it can be used to calculate an actual casing thickness. The calculated frequency can also be used in place of the predicted frequency in calculations requiring a frequency term (described below). In addition, a baseline having this frequency can be established and used to adjust the phase and then the amplitude of the received signal according to known numerical fitting methods. By eliminating extraneous reflector modes, it is believed that the amplitude of the signal processed in this manner more accurately represents the relevant part of the received signal.

A second series of measurements is highly sensitive to the bonding of the cement to the casing wall. This technique creates atomic motion in the casing, which requires transmission of shear waves to the material behind the casing. Since fluids, even thin fluid gaps, cannot propagate shear energy, good shear bonding of cement to casing will result in strong attenuation of shear waves transmitted through the casing while poorly bonded or unbonded cement will allow the signal to be transmitted with much less attenuation. Thus, for shear mode analysis of the cement bond, transducers 36, 38 are used as transmitters and transducers 32, 34 are used as receivers, thereby forming a TRRT array. For ease of understanding, transducer 36 may sometimes hereinafter be referred to as $T_1$, transducer 38 as $T_2$, transducer 32 as $R_1$, and transducer 34 as $R_2$, but it will be understood that the subscripts 1 and 2 are not indicative of any particular activation order and can be reversed. This array provides information concerning the cement-to-casing bond quality between $R_1$ and $R_2$. The symmetry of this configuration permits attenuation measurements without calibrated transmitters and receivers. It will be understood that, while the array described above is presently preferred, other array configurations, such as RTTR and RTRT, could alternatively be used. These are less preferred because, as a result of the way signals are transmitted, arrays other than TRRT tend to result in signals that are less easily interpreted.

In this second series of measurements, the degree of attenuation of a signal transmitted longitudinally through the casing is used to evaluate the quality of the cement bond. Specifically, an acoustic signal is transmitted from $T_1$ and received sequentially at $R_1$ and $R_2$. The optimal frequency for this measurement will vary from well to well, but is likely to be in the 80 kHz to 500 kHz range. The waveform of the signal received at each receiver is measured and recorded. Next, a signal is transmitted from $T_2$ and received sequentially at $R_2$ and $R_1$. Again, the waveform of the signal received at each receiver is measured and recorded. For each waveform, the arrival time of the first energy, or "break", is recorded. Time windows are selected for precalculated time delays after the first break. These time intervals correspond to voxels behind the inside wall of the casing. The first time window is selected so that relatively little energy has propagated to the back wall of the casing. The average energy in this window is used to normalize the later time windows. The second time window is selected to have approximately the same duration as the first window. This window contains information about material behind casing that is less than half the casing thickness behind casing. Successively later time windows are selected to have durations calculated to correspond to the desired radial thickness of the voxels to be measured.

The square root of the energy of the received signal has the dimensions of amplitude and can be used to calculate a compensated attenuation measurement by using all four measurements for each voxel, according to the following equation:

$$\text{Attenuation} = 10 * \text{Log}[(A_{12} * A_{21})/(A_{11} * A_{22})]/d \qquad (2)$$

where $A_{ij}$ is the square root of the total energies of the acoustic signal arriving at receiver j from transmitter i in the appropriate time window and d is the distance between receivers $R_1$ and $R_2$. As mentioned above, other array configurations can be used according to this technique, but the signal from the TRRT array described herein is preferred, as it results in a signal that is mostly free of interference and therefore relatively easy to interpret. It is preferred that the received data be decimated according to known decimation techniques in order to reduce the effect of high frequency noise. One such decimation technique is to average each data point with the succeeding data point, which has the effect of reducing noise in the signal by one-half.

Because the attenuation of the signal arriving in the second time window will be affected primarily by the presence of a bond between the casing and cement, the attenuation measurement during this window provides information about the cement-to-casing bond. Regardless of the quality of the cement bond, the inside of the casing is in contact with the mud, so attenuation due to the inner wall of the casing is constant. Therefore, degree of attenuation of the signal arriving during the second time window can be normalized and compared to the expected attenuation for either bonded or debonded cement to give information about the quality of the bond.

In addition to interpretation of the attenuation data in the second time window, time windowing can be used in conjunction with later arriving attenuation data to obtain information regarding the thickness of the cement layer, provided the appropriate circumstances exist. To detect cement thickness by any acoustic technique, the acoustic impedance of the cement must contrast with that of the material behind the cement because a boundary between materials with contrasting impedance is needed to reflect acoustic energy. In addition, energy reaching the reflector will primarily have the thickness resonance frequency of the casing. Transmitted energy at this frequency can be generated using the broad bandwidth stacked transmitters and the broad bandwidth single element receivers described above. To the extent that other frequencies are transmitted, these off-resonance signals are greatly reduced in amplitude due to the impedance mismatch at the back wall of the casing. Thus, if a signal close to the casing resonance frequency is generated and the acoustic impedance of the material surrounding the borehole contrasts sufficiently with the acoustic impedance of the cement, a signal indicative of the back of the cement can be detected.

The first arrival from the back wall of thin cement (or a fluid layer) behind casing is delayed by the travel time through the material behind casing. Thus, successive time windows give information about the presence of reflectors (such as the cement back wall) farther and farther behind casing. The timing of the earliest window to give evidence of a reflector behind casing is used to calculate the distance of that reflector (boundary) from the outside of the casing. In the case of good bonds (as identified by other techniques described herein), cement velocity is used to calculate distance. In the case of liquid behind casing, fluid velocity is used to calculate distance.

The strength of the wave arriving at the receiver depends on the thickness of the cement. If the cement is very thick, acoustic spreading losses prevent the transmission of significant energy to the receiver. If the cement layer is very thin, most of the cement energy is lost to the formation and casing. The strongest cement plate wave occurs when the cement layer is approximately one wavelength thick. Thus, the tool can be calibrated using empirical comparisons with signal strength measurements on previously gathered data from laboratory specimens having known cement thicknesses to give a separate, independent indication of thickness.

For thick cement, timing the arrival of the head wave in cement at each receiver allows estimation of the speed of sound in the cement. The cement speed of sound is slower than the speed of sound in steel but faster than the speed of sound in water. This head wave arrival is usually weaker than signals from the back boundary of cement and can be identified using other techniques. For example, the angle beam or 2 MHz transducer can be used to find regions with thick cement. In these regions, head waves will not be confused with thin cement reflections.

Prior art tools using the radial mode wave propagation may confuse thin cement with a debonded condition because the reverberation of casing resonance is sometimes similar to the radial resonance reverberations in thin cement. The attenuation method used in conjunction with the radial mode removes the ambiguity between thin cement and debonded casing. The combined measurements of all techniques in this invention remove the ambiguity that exists if fewer than all techniques are used.

Figure 7:
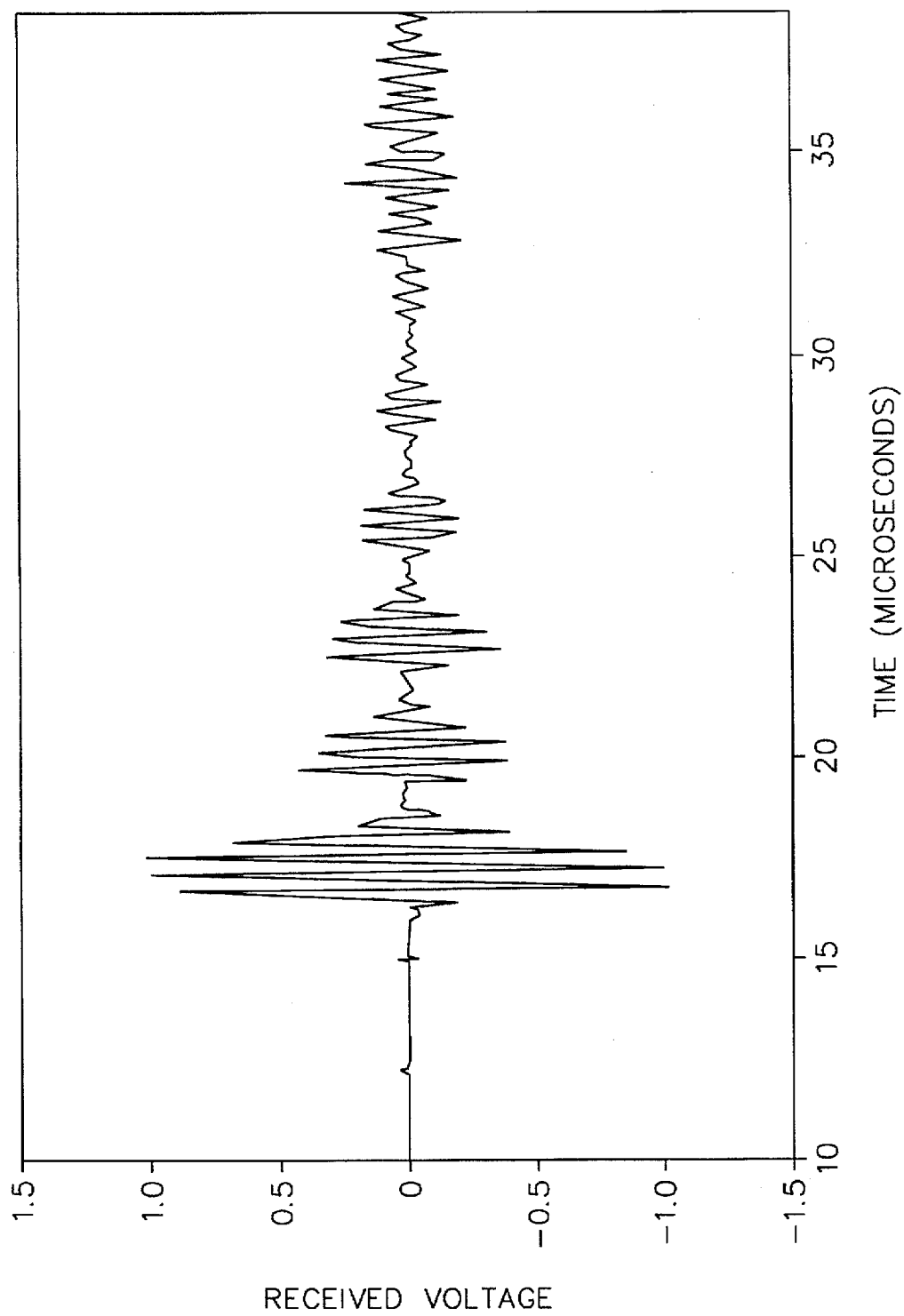
FIG. 7 is a plot of the received voltage for a 2 MHz signal in a steel casing surrounded by cement.

Once the direct wave from one transmitter to one receiver arrives through the fluid inside casing, information about boundaries behind cement is obscured. This condition occurs sooner for the near receiver than for the far receiver. For this reason, only the waveforms corresponding to the voxel windows for the far receivers contain useful information. The waveforms from these far windows can be normalized by using amplitudes of signals arriving at the near-receiver during a first time window that is selected to end before the fluid arrival at the near receiver. $T_1R_2$ and $T_2R_1$ can be used in conjunction with previously determined calibrations to determine thickness of the cement layer. The frequency of the stack must give a period short enough that the information about the existence of a 0.5 inch thick cement layer does not arrive at the receivers until after the arrival of the first cycle of the casing wave. The first cycle of the signal is strongly affected by the bonding as shown in FIGS. 5 and 6. The radial pulse-echo technique, in contrast, has had almost no attenuation of the casing wave before the arrival of the thin cement wave, as shown in FIG. 7 for the 2 MHz signal.

In addition, according to a preferred embodiment, transducers 32 and 34 are used separately from the attenuation measurement. The sizes of transducers 32 and 34 are selected to have collimated radiation patterns at 500 kHz but to have broad radiation patterns for receiving the 180 kHz attenuation signals described above. The 500 kHz collimated radiation patterns are angled to transmit or receive shear waves in the steel casing which refract to create either shear or compressional waves in the material behind casing. The receivers 32 and 34 are each angled to receive high frequency waves created by the farthest transmitter 38 and 36, respectively.

Transducers 32 and 34 can be used as an angle-beam, pitch-catch pair to detect boundaries that are obscured by the casing fluid arrival for far receiver measurements with transducers 36 and 38 acting as transmitters. This angle beam technique receives the direct reflection from the boundary behind cement. This reception is possible after the direct fluid arrival has decayed sufficiently to observe the small behind-casing signals. The angles and separation of transducers 32, 34 are selected using ray tracing techniques to optimize reflections from the boundary between regions 26 and 28 in FIG. 1. This configuration permits the invention to measure fluid thicknesses greater than 0.25 in. and solid (cement) thicknesses greater than 0.5 in. Casing reverberations interfere with closer measurements.

In addition to the foregoing measurements, radial mode waves generated by transducer 30 are used to determine the acoustic impedance of the cement. The radial wave atomic motion is perpendicular to the casing surface, which creates compressional waves in the material behind casing. Compressional waves propagate in fluids or solids, giving the acoustic impedance of either material directly. In contrast, the symmetric plate wave of the attenuation method has atomic motion primarily parallel to the surface of the casing and only give indirect information about the acoustic impedance of the material behind casing. For these reasons, the radial mode waves generated by transducer 30 operating in pulse-echo mode are preferred for measuring the acoustic impedance of the material behind the casing. The attenuation method described above is not a reliable indicator of acoustic impedance because it depends on shear bonding and fluid viscosity as well as acoustic impedance.

Signals from transducer 30 can also be used with time windowing to obtain some information about the distance to a reflective layer behind casing. The arrival of the reflected mode interferes with the casing resonance. This interference can be either constructive or destructive. Therefore, time windows that indicate an abrupt increase or decrease from the normal exponential decay of amplitude give the timing to reflectors from the reflective layer.

This time windowing approach is also used with the "far" transducer signals arriving at transducers 32 and 34 after the fluid arrival. The far receiver time windows, however, include two frequencies. The first is the low frequency transmitted to determine bonding as described above, and the second is the casing resonance frequency returning from reflectors behind casing. The calculated casing resonance frequency is used for phase correlation and amplitude adjustment as discussed above, to eliminate the low frequency signals. Like the calculated frequency, the processed amplitude can be used advantageously in place of the raw data in the calculations described below.

The 2 MHz transducer is used to detect flaws in the cement and to measure cement thicknesses thinner than 0.5 inches. Detection of thin cement and the determination of the thickness of the thin cement may involve a combined analysis of all of the foregoing methods because of the different dependence of each measurement on the thickness of cement.

Example Showing Discrimination between Free and Bonded Plate

The device shown in FIG. 4 was used to measure the ability of the present tool to discriminate between free and bonded aluminum plate using the signal attenuation method described above. The device comprised a piece of 0.25 in. aluminum plate 100 to which were affixed a pair of transmitters $T_1$, $T_2$ and a pair of receivers $R_1$, $R_2$. To establish a benchmark for unbonded situations, the back side plate 100 was left exposed to air. The measurements described above were made and the attenuation calculated therefrom. To simulate a bonded casing, a layer of sandstone was bonded with epoxy. Again the measurements described above were made and the attenuation calculated therefrom. The four waveforms generated by the receivers in response to signals from each of the near and far transmitters in the unbonded case are shown in FIG. 5, while those generated by the receivers in the bonded case are shown in FIG. 6. It can be seen that attenuation, as indicated by the peak to peak voltage for the first peak and first valley of the acoustic signal arriving at a given receiver is much greater in the bonded case, particularly in the far receivers ($T_1R_2$ and $T_2R_1$). Thus, the presence or absence of a bond is determined by comparing attenuation data in this manner.

Detection of Reflective Boundaries Beyond 0.05 Inches Behind Casing

FIG. 7 shows the signal received at a typical 2 MHz transducer 40, used in the pitch-catch mode. The amplitude modulated signal comprises a plurality of "packets" separated by periods of relative quiet. The first packet is from the steel/water boundary and the second through sixth packets are reverberations within the steel. The first "break" of the first packet represents the travel time from transducer to the ID of the casing. From the speed of sound in the fluid, this time gives the standoff distance from transducer to casing. At twice this time, the first reverberation in fluid occurs and prevents interpretation of reverberations in steel or in the material behind steel that lie at distances more than twice the standoff distance. Nevertheless, the signal arriving between the first and sixth packets gives useful information before the arrival of the fluid reverberation.

The timing between successive packets gives the casing thickness. If a signal occurs in the valley between the first and second packets, a reflector such as lamination or void exists in the steel. This steel reflector signal will interfere with detection of reflectors behind casing whose signals would be present in the second or later valleys.

A gap or channel that appears as a milliannulus when attenuation or pulse-echo tools are used must have an indication of a reflector in the second valley of the 2 MHz transducer signal to qualify as a gap of less than 25% of the thickness of the casing. It is important to distinguish between milliannuli and microannuli and between large and small milliannuli because the threshold gap size into which cement will flow typically lies in this region. That is, gaps smaller than 25% of the casing thickness and larger than a microannulus can often be treated by squeezing cement into them. The amplitude of the 2 MHz signals in the second valley correlates with gap size. Empirical measurement of gap sizes versus amplitudes can be correlated with the ratio of the valley signal amplitude to the next peak signal amplitude. Look-up tables can be used to estimate gap size from signal amplitude and thereby to predict whether the gap is large enough for cement to flow into it.

The third valley of the 2 MHz signal corresponds to a reflector in cement at less than 75% of the casing thickness for bonded pipe or, for free pipe, a liquid boundary at less than 37% of the casing thickness. The fourth and fifth valleys of the 2 MHz signals correspond to cement penetrations of 125% and 175% for cement or 63% and 87% for liquid behind casing respectively.

The pulse-echo and attenuation bond measurements indicate whether to use the cement (bonded) or liquid (unbonded) distances behind casing. Since the attenuation technique attenuation measurements are more reliable in predicting bonding than conventional pulse-echo techniques, the signal processing algorithm weights the attenuation bonding measurement more heavily in determining whether to use a liquid or cement distance. The weighting factor is preferably determined by observing the statistical reliability of each method on laboratory specimens.

For distances behind casing greater than approximately 200% of the casing thickness, the angle transducers give the best resolution of the distance behind casing. At shorter distances, the angle transducer signals are obscured by casing ringdown and the attenuation and 2 MHz results are more reliable. Weighting factors must be empirically determined from laboratory specimens.

Because the signals in FIG. 7 were obtained with high pass filtering, no dc offset exists. To obtain the real amplitude of the oscillatory signals in the valley, the energy envelope of the 2 MHz contribution must be determined. The energy envelope is obtained from the equation:

$$A_0 = [(V^2 + (2\pi f)^{-2}(dV/dt)^2)]^{1/2} \tag{3}$$

where V is the received signal and f is the approximate center frequency of the received signals.

Figure 8:
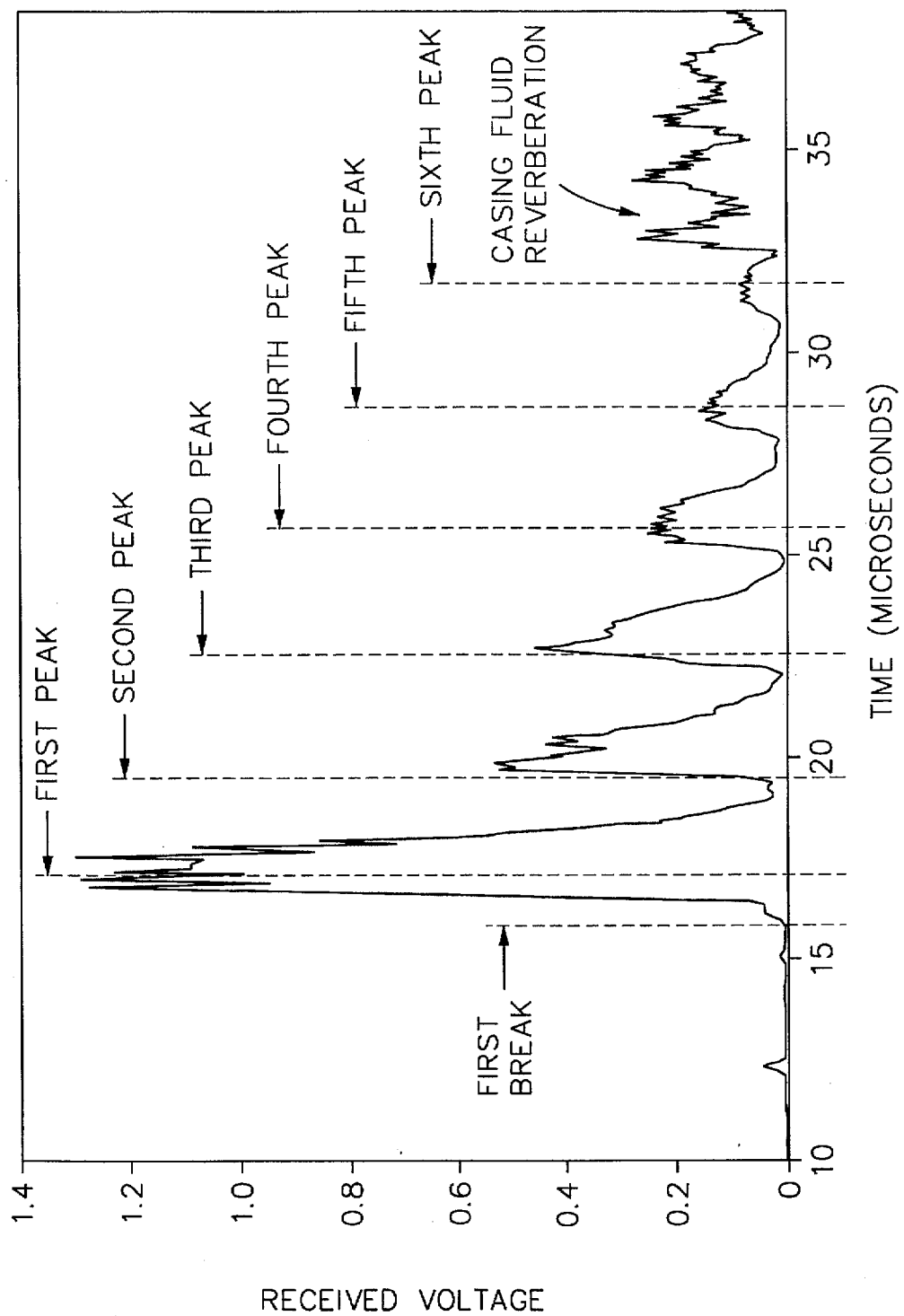
FIG. 8 is a plot of the output voltage derived by processing the amplitude and first derivative of the 2 MHz signal of FIG. 8.

This equation for $A_0$ preserves dc offsets, if they exist. FIG. 8 shows the output signal after processing. The first break is obtained by finding the first time that the output exceeds 4 (3 to 6) times the average of the previous 50 (20 to 70) output points. The peak values used for calculations are averages of 9 (3 to 25) output points. The amplitude of the first peak is used to normalize the amplitudes of the minima in the valleys and the peak amplitudes.

The decay of the amplitudes from peak 2 to peak 6 is dependent on the impedance of the material behind casing and on the alignment of the transducer with the casing surface. Since the decay is more sensitive to misalignment at 2 MHz than at the 380 kHz used in the pulse-echo technique, and for the reasons discussed earlier, the pulse echo technique is preferred for measuring acoustic impedance of material behind casing.

Figure 9A:
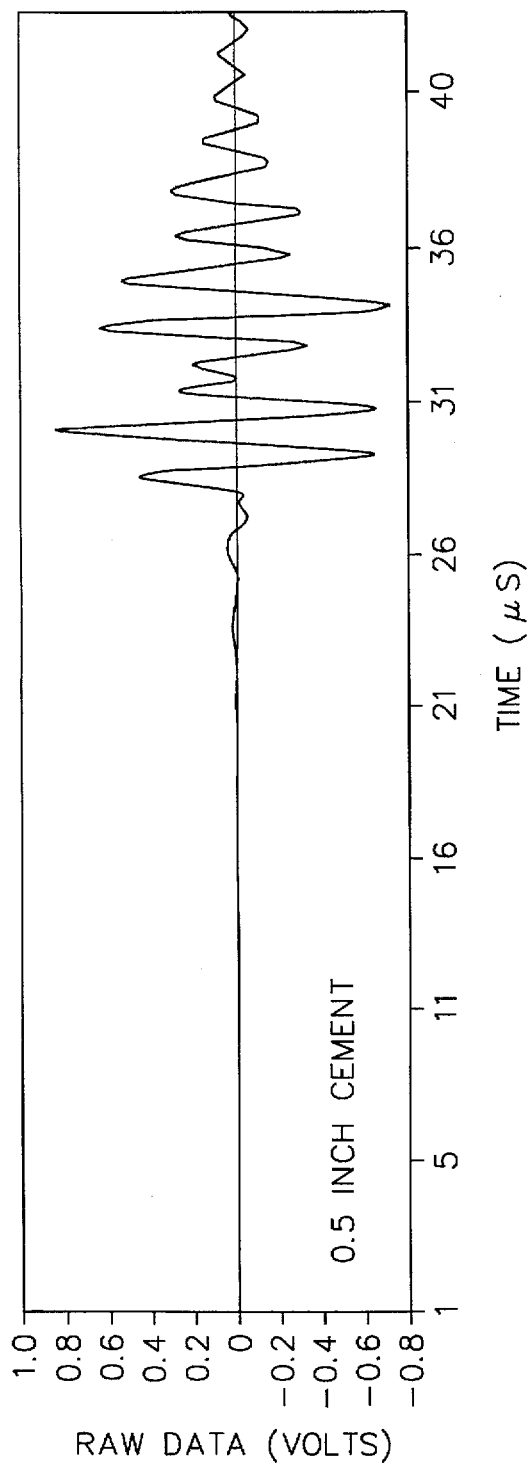
FIGS. 9A and 9B are a pair of plots of the voltage received using angled transducers in a steel casing surrounded by thin (0.5 in.) cement and cement having a thickness greater than 1 inch, respectively.
Figure 9B:
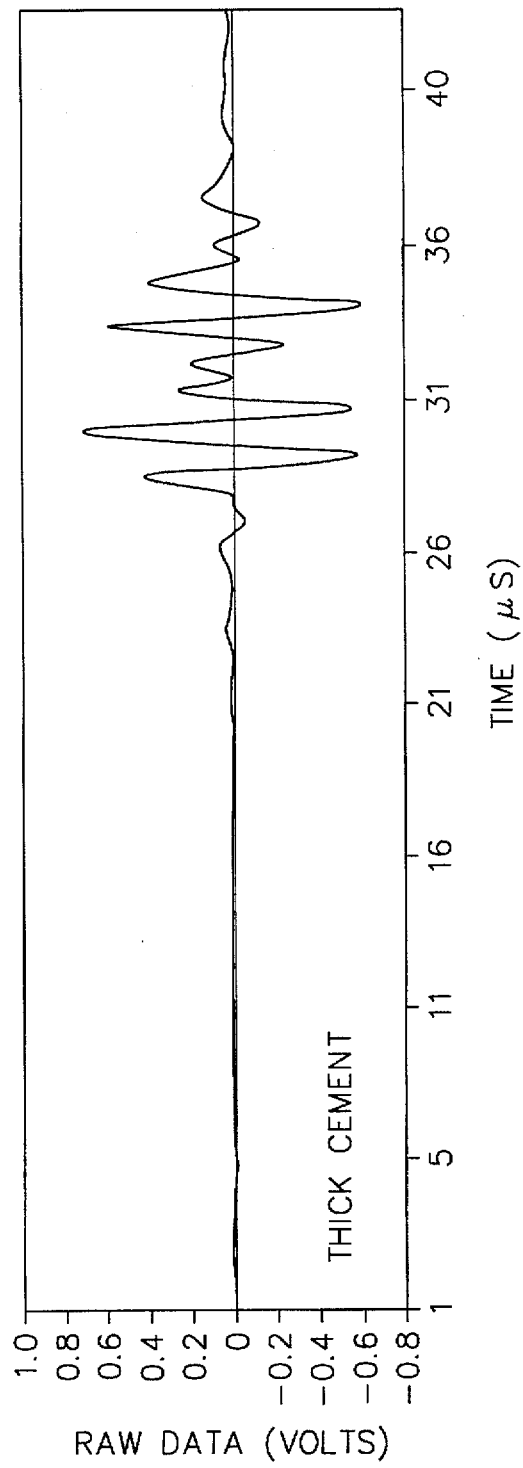

The output of the analog-to-digital converter for an angled transducer pitch-catch signal with band pass from 350 kHz to 450 kHz is shown in FIG. 9. The transducer was in a cement specimen with eccentered casing having casing wall thickness of 0.3 inches, a minimum cement thickness of 0.5 inches and a maximum cement thickness of 4.5 inches. In FIG. 9A, the transducer azimuth was selected to interrogate the thin cement region. In FIG. 9B, the azimuth was selected to interrogate the 4.5 inch thick cement region. To eliminate low frequencies and dc offsets from the energy envelope, the data were processed according to the equation:

$$A_0 = (2\pi f)^{-1} \cdot [(dV/dt)^2 + (2\pi f)^{-2}(dV/dt^2)^2]^{1/2} \tag{4}$$

Figure 10A:
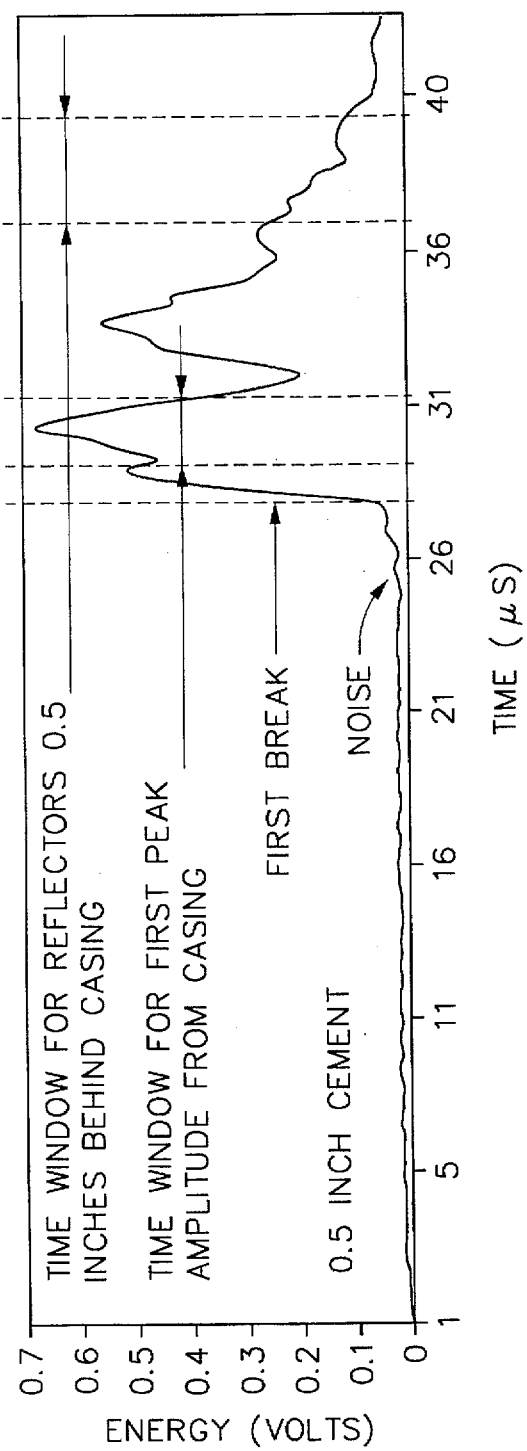
FIGS. 10A and 10B are a pair of plots of the output voltage derived by processing the first and second derivatives of the signals of FIGS. 9A and 9B, respectively.
Figure 10B:
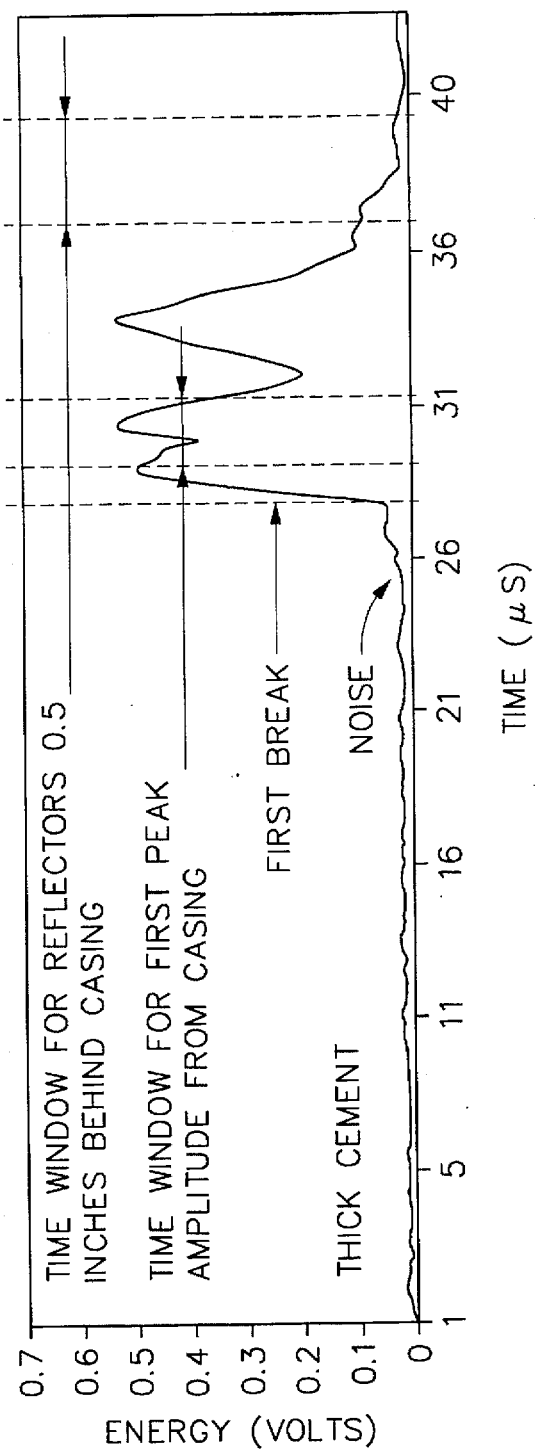

FIGS. 10A and 10B show the angle beam data of FIGS. 9A and 9B, respectively, processed in this manner. The conventional methods of subtracting dc offsets (using highpass filtering or subtracting the average amplitude of all data points from each data point) can be inaccurate because of transients. Accordingly, the above processing technique is preferred, as the differentials in the equation reject low frequencies. High frequency noise is rejected by requiring the break data point to exceed by 3 to 5 standard deviations the running average of a string of previous points. The first peak contains primarily casing reverberations. Reflector time windows are empirically selected to be late enough in time so that variations in the ringdown of the first peak do not give false reflector signals. The average amplitude in the first peak time window is used to normalize the average amplitude in the later time windows for detecting reflector signals. Calipering reflector distances behind casing is achieved by using multiple time windows after the window shown in FIG. 10.

The signal processing technique described above is not limited to use in analysis of the angle beam signals and can be used advantageously in processing the 2 MHz, attenuation and pulse-echo signals as well.

Example Showing Combined Multiparameter Analysis.

FIG. 11 shows a simulated log which would be generated by combining information obtained from all four techniques: conventional pulse-echo, attenuation, angle beam and 2 MHz, using the signal processing described herein. The log comprises a series of grids (a)–(f) that correspond to the voxels of FIG. 3 at multiple depths. The grids can be interpreted as an image of the region behind casing. Each grid (a)–(f) shows the voxel signals vs. depth in the well and vs. azimuth for a particular depth behind casing.

The microannulus grid (a) shows that a microannulus exists between 0–90 degrees for depths 0–12. The milliannulus grid (b) has a weak signal (light gray) from 270 to 360 degrees at depth 13–15 and stronger signal from 0–360 degrees at depth 16 (a thick casing joint). This signal (the amplitude of the minimum in the second valley for the 2 MHz signal) occurs because of threads inside the joint.

The third valley for 2 MHz, shown as (c), occurs at a depth behind casing corresponding a distance equivalent to 75% of casing thickness for cement (or 37% for liquids). The reverberations from the milliannulus cause standing waves which affect all valleys. The fourth and fifth valleys, which are shown as grids (d) and (e) and represent cement penetrations of 1.25 and 1.75 times the casing thickness of casing, respectively, both indicate the presence of channels in the cement between 90 and 135 degrees. The fifth valley (e) also shows a thin cement region between 180 and 225 degrees. Typically, thin cement occurs at the low side of the hole (note that the microannulus is shown 180 degrees from the thin cement). The region corresponding to cement depth greater than twice the casing thickness, grid (f), is imaged by angle transducers. In grid (f), the thin cement region covers a larger azimuthal range at the greater radius, as expected for casing eccentered in the hole. The image at depth 0 and azimuth 0 corresponds to a cement void at a depth greater than twice the casing thickness. To detect this void, pressure is applied to close the microannulus. Otherwise, the free pipe reverberations accompanying an open microannulus would mask the void signal.

Resolution and Advancement of the Tool

No tools currently use this combination of methods to overcome the difficulties in attaining an unambiguous interpretation of cement thickness. The rotational speed of the rotating head holding the transducers and the sequential firing rates of the transducers are adjusted to complete inspection of one voxel azimuthal width per firing sequence. The next set of measurements occurs as the head rotates through the next voxel width. When all voxels in one radial plane have been interrogated by all transducers, the full circumference of the casing and cement have been inspected. During one complete rotation of the head, the present tool is advanced axially in the casing a distance that will give the desired helical pitch for the desired percentage coverage in the axial direction.

In order to avoid undesirable attenuation attributable to the mud, each of the transducers is spaced a preferred optimum distance from the inside casing wall. The spacing is such that it gives sufficient signal strength without necessitating mud excluders, which replace part of the mud path with a low attenuation fluid. Since mud attenuation increases proportionally with mud density and frequency, smaller spacings are required for heavier muds and higher frequencies.

Because of the way in which the transducers 36, 32, 34 and 38 are aligned on the tool, the tool allows detection of cement flaws within a narrow 10 degree azimuthal zone, which is a significant advance in resolution over previously known tools. Likewise, the present tool is capable of determining the thickness of cement or fluids at distances up to 0.75 in. from the outside of the casing.

The present tool can be used in place of or to supplement data obtained by conventional logging tools, including pulse-echo tools (PET), cement bond logging (CBL) tools, segmented bond tools (SBT) and circumferential acoustic scanning tools (CAST). None of the listed conventional tools is capable of providing both a 10 degree azimuthal resolution and the capability of operating in 18 lb/gal mud, plus a cement penetration of at least 0.75 inches. The mud CAST type tools have 10 degrees azimuthal resolution, but attenuation limits the conventional tools to operating in muds less than 15 lb/gal. Some CAST type tools have excluders that produce a shorter travel path in mud, thereby permitting operation in 18 lb/gal mud. Excluders, however, can introduce reverberation noise. The SBT tools have pads that contact the casing surface and can operate in any mud weight. The SBT tools have an azimuthal resolution of 60 degrees.

The present tool achieves 10 degree resolution, operation in 18 lb/gal mud and a cement penetration of 0.75 inches if the attenuation technique is applied. The narrow transducers (0.4 inches) permit 10 degree azimuthal resolution. The low frequency of 180 kHz permits mud penetration even in 18 lb/gal muds because of the small distance to casing (0.75 inches). The small distance to casing also permits the interpretation of reflectors up to 0.75 inches behind casing for casing thicknesses greater than 0.3 inches. For thinner casing, the resonant frequencies may reduce permissible mud weights to below 18 lb/gal, but permissible weights will be greater than those for CAST-type tools.

While a preferred embodiment of the invention has been shown and described, modifications thereof can be made by one skilled in the art without departing from the spirit of the invention. Likewise, it will be understood that the algorithms and processing steps that are described herein can be incorporated in surface software, in electronics as firmware or in a downhole microprocessor. Those skilled in the art will understand that several suitable digital algorithms exist for analyzing ultrasonic wave speed. Examples of these are described in *Digital Computer Algorithms to Calculate Ultrasonic Wave Speed*, G. Leisik and A. Saigal, Materials Evaluation, July 1996, vol. 54 no. 7, pp. 840–843 (ASNT). While the algorithms differ substantially, selection of an optimal algorithm is based on factors known in the art.

What is claimed is:

1. A tool for evaluating the quality of a cement seal in an annulus between a casing and a wellbore, comprising:
    a tool body having a longitudinal axis;
    a first transducer mounted on the tool body and oriented perpendicular to said axis;
    second and third transducers mounted on the tool body and longitudinally spaced apart from said first transducer, said second and third transducers having faces being inclined toward said first transducer between approximately 8 and 27 degrees with respect to said tool axis;
    fourth and fifth transducers mounted on the tool body and longitudinally spaced apart from said first through third transducers, said fourth and fifth transducers having faces being inclined toward said first transducer between approximately 8 and 27 degrees with respect to said tool axis;
    a sixth transducer mounted on said tool body and oriented perpendicular to said axis.

2. The tool according to claim 1 wherein said second and third transducers are located in a line with said first transducer, said line being substantially parallel to said axis.

3. The tool according to claim 2 wherein said fourth and fifth transducers are located in a line with said first through third transducers.

4. The tool according to claim 3 wherein said sixth transducer is located in a plane with said first through third transducers.

5. The tool according to claim 1 wherein said first transducer operates at a frequency in the range of 200 to 600 kHz.

6. The tool according to claim 1 wherein said second and third transducers operate at a frequency in the range of 80 kHz to 500 kHz.

7. The tool according to claim 1 wherein said fourth and fifth transducers are stacked transducers that emit signals at multiple frequencies in the range of about 80 kHz to about 500 kHz.

8. The tool according to claim 1 wherein said sixth transducer operates at a frequency of approximately 0.75 MHz to 3 MHz.

9. The tool according to claim 1 wherein said sixth transducer comprises a pair of transducers having centers that are positioned less than two inches apart.

10. The tool according to claim 1 wherein said sixth transducer is capable of operating as a single-housing pitch-catch transceiver or in a pulse-echo mode.

11. A method for evaluating the quality of a cement seal in an annulus between a casing and a wellbore, and for determining the casing thickness, comprising the steps of:
    (a) detecting the presence of microannuli by using acoustic techniques with and without over-pressure;
    (b) detecting the presence of milliannuli if the test of step (a) indicates a lack of bond when overpressure is applied;
    (c) determining the thickness of the cement using a high frequency acoustic signal;
    (d) determining the presence of a bond between the cement and casing by measuring the attenuation of plate waves conducted through the casing;
    (e) determining the thickness of the cement by measuring the timing of arrival of waves refracted from casing into cement, reflected and returned through the casing;
    (f) determining the acoustic impedance of the cement; and
    (g) determining the thickness of the cement at radial distances greater than twice the casing thickness behind casing using collimated angled beams.

12. The method according to claim 11, further including the step of determining the thickness of the casing using a high frequency signal.

13. The method according to claim 11 wherein step (a) is carried out using an acoustic signal having a frequency in the range of 200 KHz to 600 KHz.

14. The method according to claim 11 wherein step (c) is carried out using an acoustic signal having a frequency of approximately 0.75 MHz to 3 MHz.

15. The method according to claim 11 wherein step (d) is carried out using an acoustic signal having a frequency in the range of 80 KHz to 250 KHz.

16. The method according to claim 11 wherein step (d) is carried out using a signal arriving during a second of two time windows, the first time window including a signal transmitted through the casing.

17. The method according to claim 11 wherein step (e) is carried out using an acoustic signal having a frequency in the range of 200 KHz to 500 KHz.

18. The method according to claim 11 wherein step (e) is carried out using a signal arriving during a time window following a first time window during which a signal transmitted through the casing arrives.

19. The method according to claim 18, further including the step of examining a plurality of time windows following said first time window.

20. The method according to claim 11 wherein step (f) is carried out using a substantially radial acoustic signal having a frequency in the range of 200 KHz to 600 KHz.

21. The method according to claim 11 wherein step (g) is carried out using an acoustic signal having a frequency in the range of 200 KHz to 500 KHz.

22. A method for evaluating the quality of a cement seal in an annulus between a casing and a wellbore, comprising the steps of:

sending a first signal from a first transmitter to a first receiver and receiving the first signal at the receiver;

taking the first and second derivative over time of the received first signal and;

calculating the total energy of the received first signal according to the equation $A_0 = [(V^2 + (2\pi f)^{-2}(dV/dt)^2]^{1/2}$, where V is the received first signal and $f$ is the approximate center frequency of the received signals.

23. The method according to claim 22, further including the steps of:

sending the first signal to a second receiver and receiving the first signal at the second receiver, the first and second receivers being unequally spaced from said first transmitter;

sending a second signal from a second transmitter to the first receiver and the second receiver and receiving the second signal at each of the receivers, the first and second receivers being unequally spaced from the second transmitter;

calculating the total energy of each signal received at each receiver according to the equation $A_0 = [(V^2 + (2\pi f)^{-2}(dV/dt)^2]^{1/2}$, where $V_{ij}$ is the acoustic signal arriving at receiver j from transmitter i, $f$ is the approximate center frequency of the received signals, $A_{ij}$ is the square root of the total energies of the acoustic signal arriving at receiver j from transmitter i and d is the distance between the first and second receivers; and calculating the attenuation of each signal in the region between the first and second receivers according to the formula Attenuation=$10*\text{Log}[(A_{12}*A_{21})/(A_{11}*A_{22})]/d$.

24. The method according to claim 22, further including the step of:

eliminating the dc offset from the received first signal according to the equation: $A_0 = (2\pi f)^{-1} \cdot [(dV/dt)^2 + (2\pi f)^{-2}(dV/dt^2)^2]^{1/2}$ where V is the received first signal and $f$ is the approximate center frequency of the received first signal.

25. An apparatus for evaluating the quality of a cement seal in an annulus between a casing and a wellbore, comprising:

a rotating tool having a tool axis and supporting a pair of azimuthally focused acoustic receivers between a pair of azimuthally focused acoustic transmitters, said receivers and transmitters positioned in a plane substantially parallel to the tool axis and adapted to form a TRRT array wherein said tool is capable of achieving an azimuthal resolution of less than 60 degrees.

26. The apparatus according to claim 25 wherein said tool is capable of achieving an azimuthal resolution of about 10 degrees.

27. A method for calculating an actual casing resonance frequency from a received signal V, comprising the steps of:

selecting a time window portion of the received signal;

determining the maximum amplitude ($V_{max}$) of the absolute value of the received signal during the selected time window;

calculating the arc sin of the quotient of $V/V_{max}$ as a continuously increasing angle;

and determining the slope of a least squares fit of the calculated value over time.

28. The method according to claim 27, further including performing the frequency calculation over at least three windows and eliminating from said least squares fit those windows having frequencies more than three standard deviations from the average window frequency.

29. A method for evaluating the quality of a cement seal in an annulus between a casing and a wellbore, comprising the steps of:

(a) transmitting a high frequency acoustic signal out through the casing and cement so that said signal is reflected and returned through the cement and casing;

(b) determining the presence of a bond between the cement and casing by measuring the energy of a signal arriving during a second of two time windows, a first time window including a signal transmitted through the casing;

(c) determining the thickness of the cement by measuring the timing and energy of a signal refracted from casing into cement, reflected and returning through the casing during a plurality of time windows following said first time window.

30. The method according to claim 29 wherein step (b) is carried out using an acoustic signal having a frequency in the range of 80 KHz to 250 KHz.

31. The method according to claim 29 wherein step (c) is carried out using an acoustic signal having a frequency in the range of 200 KHz to 500 KHz.

32. The method according to claim 29, further including the step of determining the thickness of the cement at radial distances greater than twice the casing thickness behind casing using collimated angled beams.

33. The method according to claim 29, further including the step of removing a portion of said measured signals that results from waves having a frequency substantially different from the transmitted frequency of at least one transmitter element.

34. The method according to claim 29, further including the step of removing a portion of said measured signals that results from waves having a frequency substantially different from the resonance frequency of the casing.

35. A tool for evaluating the quality of a cement seal in an annulus between a casing and a wellbore, comprising:

a tool body having a longitudinal axis;

a first transducer mounted on the tool body and oriented perpendicular to said axis;

second and third transducers mounted on the tool body and longitudinally spaced apart from said first transducer, said second and third transducers having faces being inclined toward said first transducer between approximately 8 and 27 degrees with respect to said tool axis; and fourth and fifth transducers mounted on the tool body and longitudinally spaced apart from said first through third transducers, said fourth and fifth transducers having faces being inclined toward said first transducer between approximately 8 and 27 degrees with respect to said tool axis.

36. The tool according to claim 35 wherein said second and third transducers are located in a line with said first transducer, said line being substantially parallel to said axis.

37. The tool according to claim 36 wherein said fourth and fifth transducers are located in a line with said first through third transducers.

38. The tool according to claim 35 wherein said first transducer operates at a frequency in the range of 200 to 600 kHz.

39. The tool according to claim 35 wherein said second and third transducers operate at a frequency in the range of 80 kHz to 500 kHz.

40. The tool according to claim 35 wherein said fourth and fifth transducers are stacked transducers that emit signals at multiple frequencies in the range of about 80 kHz to about 500 kHz.

41. An apparatus for evaluating the quality of a cement seal in an annulus between a casing and a wellbore, comprising:

a rotating tool having a tool axis and supporting a pair of acoustic receivers between a pair of azimuthally focused acoustic transmitters, said receivers and transmitters positioned in a plane substantially parallel to the tool axis and adapted to form a TRRT array, wherein the azimuthal extent of radiation propagation for each of said transmitters is approximately 60 degrees.

42. The apparatus according to claim 41 wherein said acoustic receivers are azimuthally focused.

43. The apparatus according to claim 41 wherein said tool is capable of achieving an azimuthal resolution of about 10 degrees.

* * * * *